United States Patent [19]

Eck

[11] Patent Number: 4,573,273
[45] Date of Patent: Mar. 4, 1986

[54] CONNECTOR FOR A VEHICLE MEASURING SYSTEM

[75] Inventor: Leonard F. Eck, McPherson, Kans.

[73] Assignee: Hein-Werner Corporation, Waukesha, Wis.

[21] Appl. No.: 699,321

[22] Filed: Feb. 7, 1985

[51] Int. Cl.⁴ .............................................. G01B 11/27
[52] U.S. Cl. .................................. 33/180 AT; 33/288; 24/503; 248/231.3
[58] Field of Search ........... 33/180 AT, 181 AT, 288; 248/221.4; 24/455, 458, 459, 489, 498, 499, 503, 515, 530

[56] References Cited

U.S. PATENT DOCUMENTS

| | | | |
|---|---|---|---|
| 3,955,249 | 5/1976 | Shiozaki | 24/503 |
| 4,049,230 | 9/1977 | Minniear | 248/231.3 |
| 4,207,681 | 6/1980 | Bayorgeon et al. | 33/180 AT |
| 4,330,945 | 5/1982 | Eck | 33/288 |
| 4,454,659 | 6/1984 | Eck | 33/288 |

Primary Examiner—Willis Little
Attorney, Agent, or Firm—Litman, Day and McMahon

[57] ABSTRACT

A connector for mounting a vehicle measuring system to a vehicle fixture hole includes spaced arms with projecting end lugs which evenly and symmetrically open and grip the material defining the hole so that the connector is centered with respect to the hole. Rotation of a thumb wheel operates a wedge arrangement to evenly spread the arms and securely tighten the connector to the material defining the hole. A bushing on the connector is connectible to the vechicle measuring system and is longitudinally adjustable to set a precise distance from the measuring system to the fixture hole.

10 Claims, 5 Drawing Figures

U.S. Patent    Mar. 4, 1986    4,573,273
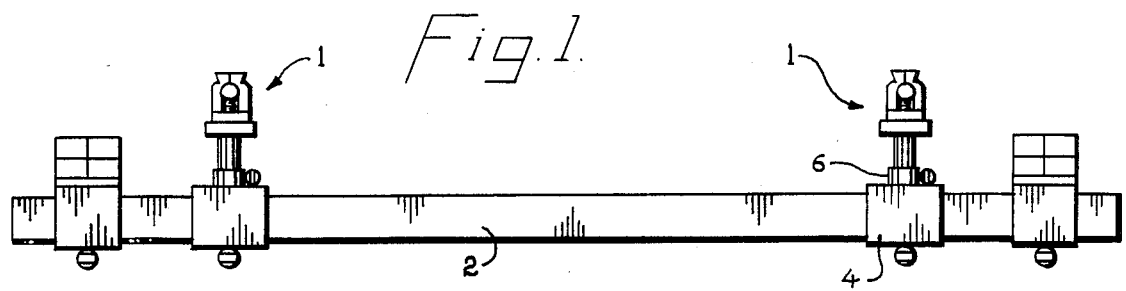
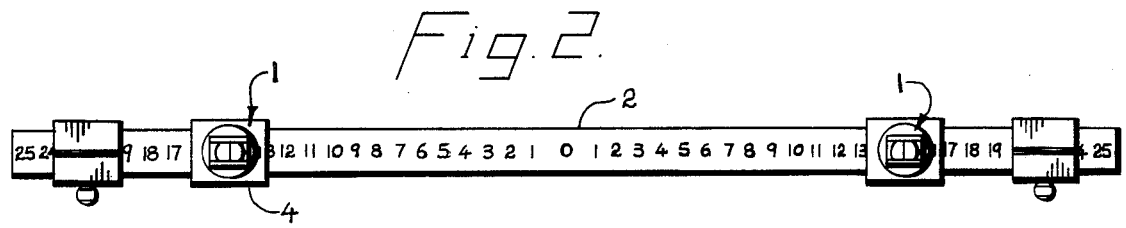
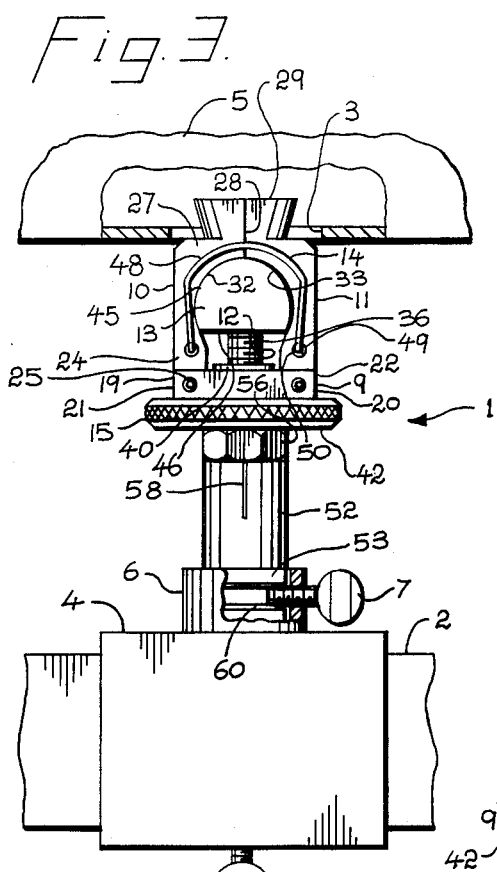
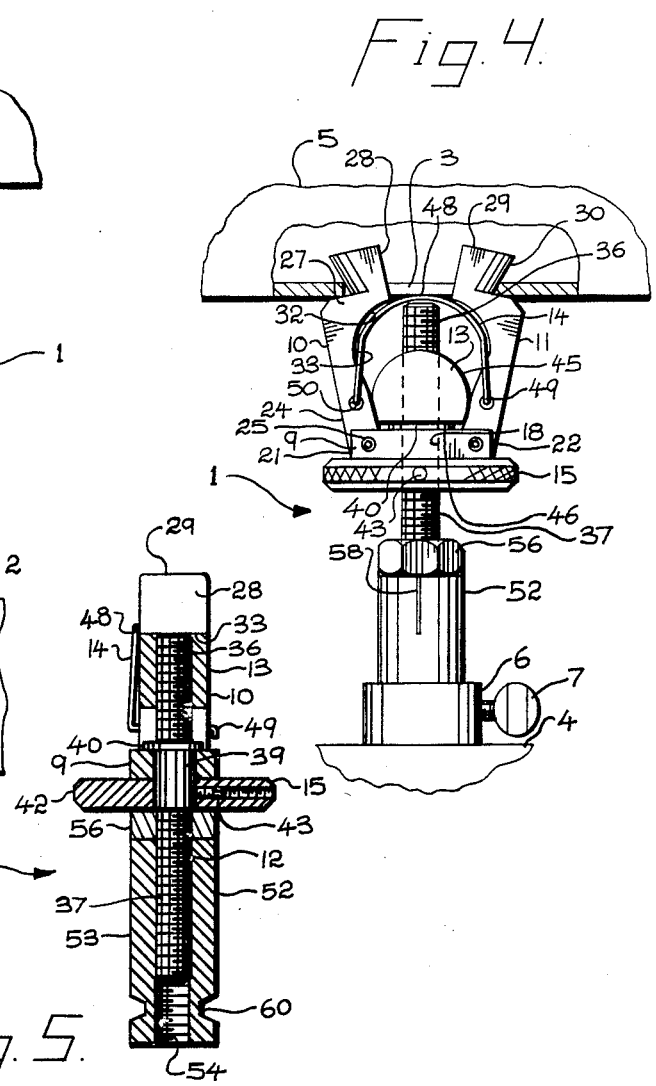

CONNECTOR FOR A VEHICLE MEASURING SYSTEM

FIELD OF THE INVENTION

This invention relates to measuring systems for determining the alignment of vehicle frames and body portions and in particular, to a connector for mounting the measuring system to the vehicle.

BACKGROUND OF THE INVENTION

When vehicles and other such structures are manufactured, the separate frames or even integral frames, as in unibody design, are assembled in large jigs with various fixtures or studs extending outwardly from appropriate places on the jig to accommodate various frame members. These frame members have holes or apertures, called fixture holes, which properly position the frame part onto the fixture studs of the jig. These parts, once positioned, are connected by other frame members, panels and the like and the vehicle or other such structure is constructed accordingly, using these fixture holes as reference points.

When the article so constructed is subsequently damaged, as in the case of a vehicle involved in a mishap, reference should again be made to the various fixture holes for precise positioning of parts and to use these fixture holes as reference points to determine the extent of the damage. Arrangements for making these determinations are becoming known in the art, one particularly successful type being disclosed in U.S. Pat. No. 4,330,945 and assigned to the assignee of the instant application. The system disclosed in U.S. Pat. No. 4,330,945 utilizes spaced measurement scale carrier bars which respectively have sighting instruments, such as laser sighting instruments, and targets mounted on ends of the bars and which are connected to the vehicle by connectors attached at the fixture holes. Clearly, the more precise that measurements can be made of the extent of the damage, the more precise can be the repair and to that end, the measurement scale carrier bars must be precisely positioned with respect to the fixture holes. Heretofore, one means of connection employed L-shaped hangers and the L-shaped arm was inserted into the fixture hole. Another connector device disclosed in U.S. Pat. No. 4,330,945 consisted of an arm arrangement spread open and closed by a thumb screw extending between the upper arms. This latter arrangement more precisely centered the connector with respect to the fixture hole, but in none of the prior arrangements did the connector provide for adjustment of the distance from the fixture hole to the measurement scale carrier bar. In certain circumstances, adjustment of this distance is desired.

The present invention provides such a connector device which centers and precisely positions a connector with respect to the fixture hole and which is adjustable in length to precisely select the distance from the fixture hole to the vehicle measuring system.

OBJECTS OF THE INVENTION

The principal objects of the present invention are: to provide a connector for mounting a vehicle measurement system to a vehicle; to provide such a connector which during use precisely centers itself with respect to the fixture hole; to provide such a connector which is adjustable in height to set a desired distance between members of a vehicle measuring system to the fixture hole; to provide such a connector which automatically draws up tight against the material defining the fixture hole; to provide such a connector which is capable of precise adjustment; to provide such a connector which is particularly adapted for connecting a vehicle measuring system such as disclosed in U.S. Pat. No. 4,330,945 to a vehicle fixture hole; and to provide such a connector which is sturdy and efficient in use and particularly well adapted for the intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DESCRIPTION OF THE DRAWINGS

FIG. 1 is an elevational view showing a portion of the vehicle measuring system with connectors embodying the present invention.

FIG. 2 is a plan view of the portion of the vehicle measuring system with the present connectors thereon.

FIG. 3 is an enlarged elevational view of the connector embodying the present invention and showing same in a closed position.

FIG. 4 is a fragmentary elevational view of the connector showing same in an open position and adjusted in height.

FIG. 5 is a longitudinal sectional view of the connector.

DESCRIPTION OF THE PREFERRED EMBODIMENT

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail:

The reference numeral 1 generally indicates a connector embodying the present invention. The connector may mount a measurement scale carrier bar 2, such as disclosed in U.S. Pat. No. 4,330,945, incorporated herein by reference, to a vehicle or other such structure having fixture holes 3. In the illustrated example, the connector 1 connects a slide member 4 mounted on the measurement scale carrier bar 2 to a vehicle frame portion 5 having the fixture hole 3 therein. The slide member 4 includes a socket 6 and a set screw, such as a thumb screw 7, extendible through the wall of the socket 6.

In the illustrated example, the connector 1 generally includes a block member 9 with confronting arms 10 and 11 swingably mounted to the block member 9 and having arm ends with means for engaging the fixture hole 3. A threaded shaft 12 extends through the block member 9 and, at an upper end, connects to a wedge member 13 which engages the arms 10 and 11. A biasing means 14 urges the arms 10 and 11 into contact with the wedge member 13 and a means 15 for rotating the threaded shaft 12 causes the wedge member 13 to move upwardly and downwardly and spread the arms 10 and 11 outwardly to engage with the fixture hole 3. An end of the threaded shaft 12 generally connects to the slide member 4 on the measurement scale carrier bar 2.

In the illustrated example, the block member 9 has a central aperture 18 and opposite sides 19 and 20 with spaced, opposite pairs of wings 21 and 22, thereby generally forming the block member 9 in the shape of an "H" with a thickened mid-body portion.

The arms 10 and 11 are spaced, confronting, and have proximal ends 24 respectively swingably connected to the pairs of wings 21 and 22 by pivots 25 extending therethrough. Distal ends 27 extend from the block member 9 and have respectively mating end surfaces 28 which fit flush against each other, FIG. 3, and have protruding lugs 29 from each of the distal ends 27 with tapered, semi-circular surfaces 30 thereon tapering toward the block member 9 and defining a catch corner between the upper surface of the distal end 27 and the tapered surface 30 of the lug 29.

The arms 10 and 11 have confronting, arcuate inner surfaces 32 providing a generally circular upper area or opening 33 which converges toward the proximal ends 24 and diverges toward the distal ends 27.

The threaded shaft 12 is elongate and extends through the aperture 18 of the block member 9 and has a first end 36 situated in the generally circular upper area or opening 33 between the arms 10 and 11 and a second end 37 extending oppositely from the block member 9. A mid portion 39 of the shaft 12 is unthreaded and has an integral thrust ring 40 positioned atop the block member 9. Secured to the mid portion 39 of the shaft 12 is the means 15 for rotating the shaft 12. In the illustrated example, the means 15 is a thumb wheel 42 having a knurled circumferential surface and chamfered edges. A set screw 43 securely and nonrotatably engages the thumb wheel 42 to the mid portion 39 of the shaft 12. The thumb wheel 42 is positioned immediately below the block member 9 to, in combination with the thrusting 40, prevent the shaft 12 from longitudinal movement relative to the block member 9. Rotation of the thumb wheel 42 causes the wedge member 13 to move upwardly and downwardly, FIGS. 3 and 4.

In the illustrated example, the wedge member 13 is threadably mounted on the first end 36 of the shaft 12 and situated in the generally circular upper area or opening 33 between the arms 10 and 11. The wedge member 13 is generally semi-circular in form, conforms to the shape of the opening 33, and has opposite, symmetrical side surfaces 45 engaging the inner surfaces 32 of the arms 10 and 11. A bottom surface 46 of the wedge member 13 is flattened for face-to-face contact with the block member 9 and the thrust ring 40, FIG. 4.

To maintain the arms 10 and 11 in contact with the wedge memer 13, the biasing means 14 extends between the arms 10 and 11. In the illustrated example, the biasing means 14 is an arcuate spring member 48 which curves about the upper area or opening 33 and generally follows its shape. The spring member 48 has opposite ends 49 extending through holes 50 in the arm members 10 and 11 adjacent the proximal ends 24 and the ends 49 are bent downwardly so that the spring member 48 remains connected to the arms 10 and 11. The arcuate shape of the spring member 48 maintains a set or memory which urges the arms 10 and 11 together tightly about the wedge member 13.

An elongate threaded bushing 52 is mounted on the second end 37 of the shaft 12 and has a distal end 53 with means for engaging the vehicle measuring system. The bushing 52 has a threaded interior bore 54 extending completely therethrough and by rotation of the bushing 52, the shaft 12 moves upwardly and downwardly, carrying the block member 9 and arms 10 and 11 therewith. To lock the bushing 52 at a desired position, a jam nut 56 is mounted on the shaft 12 and positioned between the bushing 52 and the thumb wheel 42. An index or hash mark 58 on the bushing 52 can be used to indicate the position for rotation, such as a full turn or one quarter turn or the like.

The shaft 12 is mounted to the socket 6 by means of the bushing 52 and in the illustrated example, the distal end 53 of the bushing 52 has a circumferential groove 60 therearound into which the thumb screw 7 extends to maintain the bushing 52 in position in the socket 6.

In use, the thumb wheel 42 is turned until the wedge member 13 is fully extended upwardly and the arms 10 and 11 are drawn together by the biasing means 14, FIG. 3. The tapered lugs 29 of the arms 10 and 11 are inserted in the fixture hole 3 and the thumb wheel 42 rotated in the opposite direction to pull the wedge member 13 toward the block member and symmetrically open the arms 10 and 11 outwardly to engage the lugs 29 with the periphery of the fixture hole 3. As the lugs 29 engage the periphery of the hole, the tapered, semi-circular faces tend to slip on the wall of the fixture hole and draw the arms 10 and 11 snugly upwardly, FIG. 4, until reaching the upper surface of the arm end 27.

To adjust the height of the connector 1, the bushing 52 is rotated in either direction and the distal end 53 inserted in the socket 6 and secured therein by the engagement of the thumb screw 7 with the groove 60. To lock the bushing into an extended position, the jam nut 56 is rotated tight against the top of the bushing 52.

It is to be understood that while one form of this invention has been illustrated and described, it is not to be limited to the specific form or arrangement of parts described and shown, except insofar as such limitations are included in the following claims.

What is claimed and desired to be secured by Letters Patent is as follows:

1. A connector for mounting an object to a fixture hole and comprising:
   (a) a block member having a through bore;
   (b) confronting arms swingably mounted to said block member and having ends means for engaging said fixture hole, said arms having spaced inner surfaces providing an opening therebetween and converging toward said block member;
   (c) a threaded shaft extending through said bore in said block member and having a first end for connection to said object and a second end extending into said opening between said arms;
   (d) wedge means mounted on said shaft and positioned in said opening, said wedge means engaging said arms inner surfaces;
   (e) biasing means urging said arms into contact with said wedge means; and
   (f) a wheel means for rotating said threaded shaft, said wheel means being positioned adjacent said block member and affixed to said threaded shaft, whereby when said shaft rotates, said wedge means moves thereon and urges said arms outwardly to engage said ends means with said fixture hole.

2. A connector for mounting an object to a fixture hole and comprising:
   (a) a block member having a through bore;
   (b) confronting arms swingably mounted to said block member and having ends means for engaging said fixture hole, said arms having spaced, symmetrical inner surface providing an opening therebetween and converging toward said block member;
   (c) a threaded shaft extending through said bore in said block member and having a first end for connection to said object and a second end extending into said opening between said arms;
   (d) wedge means mounted on said shaft and positioned in said opening, said wedge means having symmetrical surfaces engaging said arms inner surfaces;
   (e) biasing means urging said arms into contact with said wedge means; and
   (f) means for rotating said threaded shaft, whereby when said shaft rotates, said wedge means moves thereon and urges said arms symmetrically outwardly to engage said ends means in said fixture hole in a centered position;
   (g) said means for rotating said threaded shaft includes a thumb wheel positioned adjacent said block member and affixed to said threaded shaft.

3. The connector set forth in claim 2 including:
   (a) a threaded bushing mounted on said threaded shaft first end and rotatable thereon to adjust the position of said block member relative to said bushing;
   (b) said bushing having means for connection to said object.

4. The connector set forth in claim 3 wherein:
   (a) said means for connection includes a circumferential groove about said bushing;
   (b) said object has a socket for receiving said bushing and a screw extending laterally into said socket for engagemet with said groove.

5. The connector set forth in claim 2 wherein:
   (a) said biasing means includes an arcuate spring member extending between said arms and having opposite ends engaged in said arms and biasing said arms to a closed position.

6. The connector set forth in claim 2 wherein:
   (a) said means for engaging said fixture hole on said arms ends includes respective, outwardly protruding lugs having surfaces tapering toward said arms.

7. The connector set forth in claim 3 including:
   (a) an index mark on said bushing to mark relative rotation of said bushing on said shaft.

8. A connector for mounting a vehicle measuring system to a vehicle fixture hole comprising:
   (a) a block member having a central aperture and spaced, opposite pairs of wings;
   (b) a pair of spaced, confronting arms having proximal ends respectively swingably connected to said pairs of wings and distal ends extending therefrom and having respectively mating end surfaces with protruding, tapered lugs thereon; said arms having confronting, arcuate, symmetrical inner surfaces providing an opening therebetween and converging toward said proximal ends and diverging toward said distal ends;
   (c) an elongate threaded shaft extending through said aperture in said block member and having a first end situated in said opening between said arms and a second end extending oppositely from said block member;
   (d) an elongate threaded bushing mountable on the second end of said threaded shaft and having a distal end with means for engaging said vehicle measuring system, said bushing being rotatable on said threaded shaft to vary a distance of said vehicle measuring system from said block member;
   (e) a wedge member threadably mounted on said first end of said threaded shaft and situated in said opening, said wedge member having opposite, symmetrical side surfaces engaging said arms inner surfaces;
   (f) an arcuate spring member extending between said arms and having spaced ends engaged in respective said arms, said spring member biasing said arms into engagemet with said wedge member; and
   (g) a thumb wheel positioned between said bushing and said block member and secured to said threaded shaft whereby when said thumb wheel rotates, said wedge member moves on said threaded shaft and urges said arms symmetrically outwardly to engage said lugs in said fixture hole in a centered position.

9. The connector set forth in claim 8 including:
   (a) a jam nut threadably engaged on said threaded shaft and positioned between said thumb wheel and said bushing.

10. The connector set forth in claim 8 wherein:
    (a) said bushing distal end with means for engaging said vehicle measuring system in a circumferential groove about sa distal end and said vehicle measuring system includes a socket with a set screw therein for engagement with said groove.

* * * * *